(12) United States Patent
Maher

(10) Patent No.: US 10,825,119 B2
(45) Date of Patent: *Nov. 3, 2020

(54) WIRELESS, TRAFFIC-REGULATED CUSTOMS DECLARATION SERVICE

(71) Applicant: The Government of the United States of America, as represented by the Secretary of Homeland Security, Washington, DC (US)

(72) Inventor: David Maher, Washington, DC (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/776,286

(22) Filed: Jan. 29, 2020

(65) Prior Publication Data

US 2020/0175629 A1    Jun. 4, 2020

Related U.S. Application Data

(63) Continuation of application No. 16/285,636, filed on Feb. 26, 2019, now Pat. No. 10,679,310, which is a
(Continued)

(51) Int. Cl.
*G06Q 50/26* (2012.01)
*G06F 16/83* (2019.01)
*G06F 16/22* (2019.01)

(52) U.S. Cl.
CPC ....... *G06Q 50/265* (2013.01); *G06F 16/2228* (2019.01); *G06F 16/83* (2019.01)

(58) Field of Classification Search
USPC .......................................... 726/11
See application file for complete search history.

(56) References Cited

U.S. PATENT DOCUMENTS 7,147,155 B2    12/2006  Weekes
8,639,935 B2 *   1/2014  Raleigh ............... G06Q 20/102
                                                  713/181
(Continued)

OTHER PUBLICATIONS

"Mobile Passport Control (MPC): Program Overview", North America Airports Council International, IATA Passenger Experience Regional Workshop, Mar. 2015.
(Continued)

*Primary Examiner* — Khalil Naghdali
(74) *Attorney, Agent, or Firm* — Lavanya Ratnam; Kelly G. Hyndman

(57) ABSTRACT

Mobile collection and vetting of user supplied information is described. The systems, techniques, devices, methods, and approaches described herein can be used to obtain, validate, and vet information, such as customs information, in a mobile environment. In embodiments, methods comprise receiving information input via a mobile device. The information is encapsulated by an intermediate to escort the information through a firewall to the database. In response to vetting the information to determine if it meets one or more criteria, the method involves creating a record associated with a unique identifier, information that bio-identifies a user, or an indication of a determination that results from the vetting. In this embodiment, the method includes generating an electronic receipt for communication to the mobile device, the electronic receipt including the unique identifier.

9 Claims, 4 Drawing Sheets

Related U.S. Application Data continuation of application No. 14/487,598, filed on Sep. 16, 2014.

(56) References Cited

U.S. PATENT DOCUMENTS

| | | |
|---|---|---|
| 8,742,887 B2 | 6/2014 | Whillock et al. |
| 9,396,595 B1 | 7/2016 | Daniel |
| 2002/0198731 A1 | 12/2002 | Barnes et al. |
| 2003/0085808 A1 | 5/2003 | Goldberg |
| 2009/0007251 A1 | 1/2009 | Abzarian et al. |
| 2009/0132392 A1 | 5/2009 | Davis et al. |
| 2010/0051679 A1 | 3/2010 | Molloy et al. |
| 2013/0070974 A1 | 3/2013 | Stefani et al. |
| 2013/0260734 A1 | 10/2013 | Jain et al. |
| 2014/0108263 A1 | 4/2014 | Ortiz et al. |
| 2014/0214688 A1* | 7/2014 | Weiner .................... G06F 21/35 705/71 |
| 2015/0088778 A1 | 3/2015 | Tsao et al. |
| 2015/0193898 A1 | 7/2015 | Huruli et al. |

OTHER PUBLICATIONS

U.S. Customs and Border Protection, "Automated Passport Control: An Innovative Technological Solution and Collaborative Approach to Improving Travel Efficiency", News/Media Release, May 8, 2013, 1 page, published by the U.S. Government, http://www.cbp.gov/newsroom/local-media-release/2013-05-08-040000/automated-passport-control-innovative-technical.

Prosecution of U.S. Appl. No. 14/150,043 (US Patent Application Publication 2015/0193898), Honeywell International Inc., First named inventor Vikram Huruli.

Check-in and Airport Processing Times, Timeshttps://web.archive.org/web/20130511090958/http://www.united.com/web/en-US/content/travel/airport/process/default.aspx (Year:2013).

\* cited by examiner

WIRELESS, TRAFFIC-REGULATED CUSTOMS DECLARATION SERVICE

CROSS-REFERENCE

This application is a continuation, in accordance with 35 U.S.C. § 120, of U.S. patent application Ser. No. 16/285,636, filed Feb. 26, 2019, entitled Intermediate Communication Service, which is a continuation of U.S. patent application Ser. No. 14/487,598, filed Sep. 16, 2014, entitled Mobile Customs Declaration System and Method, the disclosures of both of which are hereby incorporated by reference in their entireties. This application is related to U.S. patent application Ser. No. 16/285,520, filed Feb. 26, 2019, entitled Intermediate Communication System, the entire disclosure of which is incorporated by reference herein. This application is related to U.S. patent application Ser. No. 16/776,170, filed Jan. 29, 2020, entitled Wireless, Intrusion-Resistant Customs Declaration Service, the entire disclosure of which is incorporated by reference herein.

GOVERNMENT RIGHTS

This invention was made with United States Government support. The Government has certain rights in the invention.

FIELD OF THE DISCLOSURE

This application relates to collection and authentication of user supplied information in a mobile environment. In embodiments, the present disclosure is directed to systems, methods, techniques, and approaches for the collection, validation, and association of information with one or more of a record, an electronic receipt associated with a record, an image of a person corresponding to the record, or bio-identification information for a person corresponding to a record.

BACKGROUND

Travelers arriving from foreign countries provide information to customs officials to ensure compliance with the laws of the nation to which they are arriving. For example, a family returning to the United States provides the U.S. Customs and Border Protection (CBP) and its personnel with information used to ensure the family complies with United States (U.S.) laws. The information, while targeted to security and law enforcement topics, can vary greatly depending on the family's situation. In the previous example, one adult parent or guardian may fill out a CPB form 6059B on behalf of the other member of the family, e.g., for the children, as well as, other adults such as a spouse. U.S. Form 6059B is used to collect information from travelers arriving from abroad. Form 6059B, while familiar to some travelers, can pose issues to inexperience travelers or travelers with uncommon situations. These problems typically manifest themselves when the traveler meets with a customs officer for a brief interview. For example, it is not uncommon for CBP personnel to note errors or omissions on Form 6059B as part of interviewing travelers arriving in the U.S. Trained CBP personnel can aid the traveler to resolve these issues, but it may delay other travelers or take CBP personnel away from other duties. In some cases, travelers undergo additional screening to resolve these issues. Secondary screening, which is more in-depth, is time consuming but it ensures compliance with the relevant laws. These situations increase the overall time it takes to properly screen groups of travelers. This can result in traveler delay and/or involve more CBP personnel to minimize wait times. Sources of delay include, but are not limited to, travelers failing to provide full and accurate information, providing misleading information, providing inconsistent information, and so on.

Popular modes of international travel compound these delays because they typically hold large numbers of travelers. Airplanes, ships, and trains, for example, carry large numbers of people that proceed through customs at substantially the same time. Although airports, border crossing stations, and docks for passenger ships are designed to handle large numbers, it is not uncommon for delays to occur when processing large crowds over a short period of time. Delays can occur as travelers complete documents, move through customs areas, and meet with a customs official. While delays may be expected to some extent, a large number of factors can compound custom review delays, which in-turn may lead to traveler dissatisfaction that may even result in a negative perception.

SUMMARY

Mobile collection and vetting of user supplied information is described. The systems, techniques, devices, methods, and approaches described herein can be used to obtain, validate, and vet information, such as customs information, in a mobile environment.

In an embodiment, a method comprises receiving information input via a mobile device. The information is encapsulated by an intermediate to escort the information through a firewall to the database. In response to vetting the information to determine if it meets one or more criteria, the method involves creating a record associated with a unique identifier, information that bio-identifies a user, or an indication of a determination that results from the vetting. In this embodiment, the method includes generating an electronic receipt for communication to the mobile device, the electronic receipt including the unique identifier.

In another embodiment, one or more tangible computer-readable storage media embody computer-readable instructions which are executable to collect information based on user input or information available to the mobile device. The instructions are also operable to obtain bio-identifiable information associated with the information, the combination of the information and the bio-identifiable information being formed into customs information suitable for communication to an intermediate that is web-enabled. The instructions are also executable to generate for output on a display include in the mobile device one or more of an electronic receipt, a unique identifier of a record at least temporarily maintained in a database by an authorization authority, bio-identifiable information, a name included in the information, or at least a portion of the customs information responsive to receipt of the electronic receipt generated by the authorization authority and communicated to the mobile device via the intermediate.

In a further embodiment, one or more tangible computer-readable storage media embody computer-readable instructions which are executable by a computer system to obtain customs information from a packet configured to allow the packet to pass through a firewall, the packet including information that would otherwise be blocked if not included in the packet. The instructions are further configured to vet the information to determine if at least a portion of the information matches information in a manifest maintained in memory associated with the computing system and generate a record in memory associated with the computing system, the record including a unique identifier and at least a portion of the information includes an image of a person associated with the information and an indication of the vetting determination. The instructions are also configured to communicate a machine readable indication of the determination with an image contained in the information to an intermediate for communication to a mobile device from which the information was obtained.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The same numbers are used throughout the drawings to reference like features.

DETAILED DESCRIPTION

Overview

Figure 1:
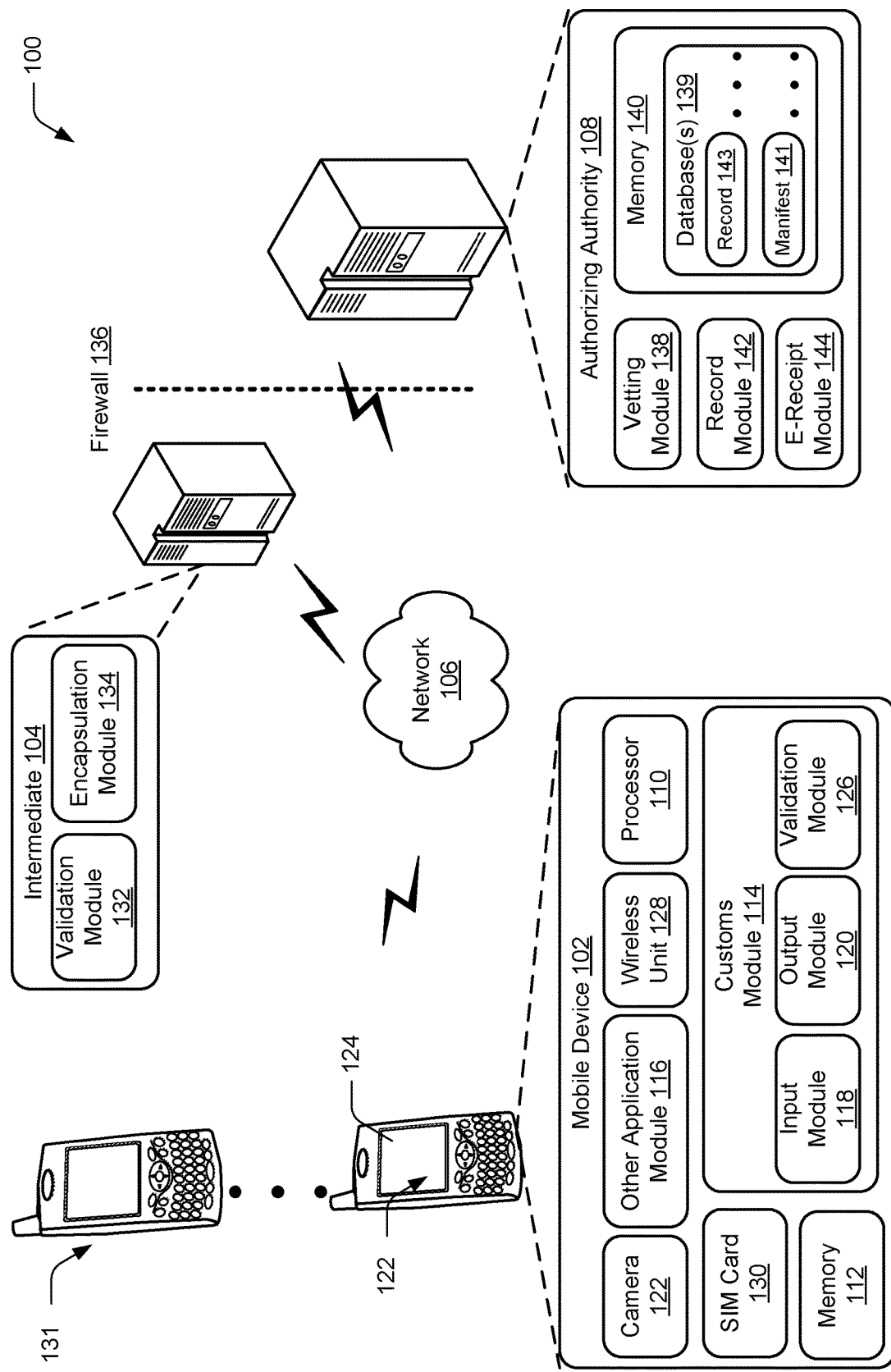
FIG. 1 illustrates an operating environment in which the inventive principles can be employed in accordance with one or more embodiments.

Collection of information for customs purposes helps ensure compliance with the laws of the country to which the traveler has arrived. Customs information is used to identify individuals who are attempting to enter the country illegally, entering for an illegal purpose (e.g., criminal activity), and so on. Customs processing also identifies contraband (e.g., on the traveler, in carried luggage, or in checked luggage or cargo). For example, travelers are asked to declare if he/she or a member of his/her travel party (e.g., people traveling with the traveler) are carrying large amounts of cash, perishable goods such as fruits, cured meats, and so forth that are not permitted.

The use of paper documents to collect information is subject to difficulties ranging from illegible handwriting, missing or omitted information, non-responsive information, retention/destruction issues, and the like. While customs personnel receive extensive training and are experts in assisting travelers, these activities take away from time that would otherwise be available to identify, investigate, and address issues with travelers engaging in unlawful conduct. For example, travelers that are unsure or are evasive in responding to questions, provide incomplete information, omit information, provide incorrect information, or otherwise raise suspicion may be instructed to secondary screening, which is more time consuming. In secondary screening, travelers may be asked questions to determine whether the traveler poses an enforcement issue.

Travelers enter countries using various modes of transportation. Popular among these modes of transportation are commercial or common carriers operated vehicles. Example vehicles include, but are not limited to, boats, trains, planes, buses, and so on. These vehicles typically carry large numbers of travelers at one time. Airlines, for instance, use large capacity aircraft that are capable of transporting several hundred passengers at once. As a result, several hundred travelers may arrive at customs at one time. Also, travel schedules (e.g., flight times or cruise times) may cause large numbers of travelers to pass through customs en masse. Certain days of the week may be busier due to traveler schedules, e.g., business travelers tend to travel on Mondays and return on Fridays. Examples of the foregoing are cruise ships that leave on schedules designed to accommodate working travelers, e.g., leave on weekends, such as Saturdays. Holidays too may cause large numbers of travelers to pass through customs in a limited time period, e.g., the Wednesday prior to Thanksgiving.

While arrivals and departures and the number of passengers on board these vehicles can be used to gauge the number of people traveling through customs, issues with collecting customs information can dramatically alter the amount of time it takes to process the individuals. The deployment of additional customs personnel and equipment to screen travelers and their luggage, while helpful to mitigate wait times, is inefficient as hiring and retaining personnel is expensive and time consuming. Delays associated with customs are somewhat non-predictable and can lead to over-staffing at times or under-staffing where wait times exceed an acceptable threshold. Additionally, support facilities and equipment are also costly. In particular, fluctuations in the number of travelers passing through a particular customs facility can lead to personnel staffing and scheduling issues. In order to avoid disrupting travel various entities set threshold wait times. For example, airports, ship terminals, governmental agencies (municipalities, state, federal) call-in or re-task personnel to shorten wait times. Accordingly, it may be a virtual necessity to process large number of travelers in a relatively short period of time.

As should be appreciated, although this document discloses embodiments, implementations, and scenarios involving travelers and customs situations, it is to be understood that the principles of the present disclosure can be applied to a wide variety of situations. For example, the techniques, approaches, software, firmware, hardware described herein can be utilized for other situations where information is collected, exchanged, vetted, or otherwise handled in a secure manner. Other situations that can benefit from this technology include, but are not limited to, student registration, registering standardized testing applicants, customer check-ins, vehicle registrations, driver license registrations, permit collection (e.g., building permits), and the like. In situations, the techniques, approaches, software, firmware, and hardware described herein are implemented to issue an electronic receipt for communication to and use by the mobile device. It is the intention of this document to encompass and include such embodiments.

In the discussion that follows, a section entitled "Operating Environment" describes but one environment in which the various embodiments can be employed. Following this, sections entitled "Example Data Flow" and "Example Methods" describe, respectively, how information can be handled and passed and how traveler information collection, communication, vetting, and traveler routing is performed in accordance embodiments. While the systems, hardware, software, techniques, methods, and approaches are described in relationship to particular implementations the underlying principles disclosed herein can be combined, adjusted, manipulated as contemplated by one of ordinary skill.

Operating Environment

FIG. 1 illustrates an operating environment in accordance with one or more embodiments, generally at 100. Environment 100 includes a mobile device 102, an intermediate 104

(e.g., one or more servers) a network 106 (one is illustrated), and an authorizing authority 108 that can comprise one or more servers.

The mobile device 102 is representative of a portable computing device that can include a variety of hardware/software, a smart phone is illustrated. As shown, the mobile device 102 includes a processor 110 and memory 112. Although a single processor is illustrated, multiple processors can be included. Additionally, although a single memory 112 is shown, a wide variety of types and combinations of memory may be employed, such as random access memory (RAM), hard disk memory, removable medium memory, and other types of computer-readable media.

In embodiments, an application embodied as program of instructions on the mobile device is implemented is stored in memory until the application is accessed, e.g., launched. As illustrated, the application is embodied as an application module, e.g. customs module 114. For example, the instructions embodying the application are included in one or more computer-readable storage media, such as tangible media, that store the instructions in a non-transitory manner. At times in this document the customs module 114 may also to referred to as a customs application, a mobile customs application, or the application solely for the purpose of understand, reader convenience, and to distinguish the customs module 114 from other applications 116 (e.g., third party applications) residing on the smart phone.

The customs module 114 may be supported, at least partially supported, and so forth by the intermediate 104. For example, the application is a web-enabled application accessible via a browser application on the mobile device 102 in which at least some functionality is enabled by the intermediate 104. For example, the customs module 114 enabled by the instructions includes an input module 118, to accept traveler information and bio-identifiable information, and an output module 120 configured to output customs related information.

In embodiments, the customs module 114 is configured to operate independently at times, while communicating with the intermediate 104 at other times. An example of the foregoing can occur during acceptance of user input. For example, a user can input information to the mobile device 102 when the device is in airplane mode or otherwise not communicatively connected to the intermediate 104. In some embodiments, the customs module 114 is configured to prevent a user from communicating the customs information until a specified time, e.g., one hour prior to expected arrival time, or upon or just prior to the occurrence of an event, e.g., landing, arrival at a gate or dock, or just prior to an aircraft descending to 10,000 feet at which time in-flight wireless communications are terminated. Imposing such a limit may avoid duplicate submissions, illegal activity, and so on.

In examples, a user inputs traveler information into the mobile device 102 using an input device that interacts with an input module that provides input functionality for the application. Information entry can occur even though the mobile device 102 is not in communication with the intermediate 104 at that particular time. Example input devices that can be used include, but are not limited to keyboards, touch screen displays, mice, gesture detectors, microphones enabled with voice recognition software, and the like that accepts input information. In examples such as these, the input module generates a text box configured to accept user input, e.g., text input by a user. In the previous example, the input module 118 can generate a graphical user interface (GUI) 122 output on a display 124 that permit a user, e.g., the traveler to enter information. As will be described in further detail later in this document, the customs module 114 can include a validation module 126 that is operable to implement rules for validating and/or conducting an initial review of the information, such as in response to a triggering event. Thus, a text box for "description of articles" can have corresponding validation rules including maximum length, minimum length, a pattern, value format, and so forth. A triggering event can be entering text, checking a box or button, browsing to a new page or display, selecting enter or save, responsive to an event (e.g., losing wireless connectivity), and so on.

For example, the validation module 126 includes validation rules for different countries, languages, information text boxes, and so on. In this manner, the validation rules can be "globalized" to for instance check information input in different languages, apply standardized rules, check information, and so forth. Example validation rules can include rules for names, addresses, flight numbers, a description of goods, responses to yes/no questions, may apply common validation rules. Examples of common validation rules include but are not limited to, a specified number of digits, a number pattern, and the like.

As to be apparent, the validation module 126 can be configured to perform additional functions, such as translating text responses. For example, the validation module 126 contains validation rules that check whether a user's response is in a language that is not officially accepted by the country to which he/she is going. The validation module 126 may do this based on a user input, e.g., a language selection, existence of a particular Unicode character in the information, comparing information to dictionaries, or the like. Due to the need for accuracy and the avoidance of confusion, the customs module 114 can maintain two versions of the information provided in a foreign language, provide a notice (e.g., "this information is based on a machine translation"), or a similar methodology. In other instances, a validation module is configured to alert the user that the language used is not acceptable for the country and provide further instructions, e.g., "please contact a flight attendant". Although the validation module 126 is described as providing translation capabilities, in other instances a dedicated translation module is included in the mobile customs application or the functionality can be provided by a remote service, or a server such as the intermediate.

It should be noted that while various structures and functions are described with respect to certain members within the environment, the functions and/or structures may be implemented by other members in the environment, e.g., the intermediate can include a validation module as described directly above and will be described below.

In embodiments, the validation module 126 is associated with a result table (stored in memory 112) that is operable to store validation records. Validation records can include data associated validation errors, successes, information correction (e.g., correction of a city name), and the like for an event that triggers validation. Thus, as text is entered, the data validation logic can validate each entered character for an event, e.g., key press, submitting or storing information. The mobile device 102 can maintain the validation records for a predetermined period of time, until occurrence of an event, and the like events.

As illustrated, the mobile device 102 includes an image capture device, e.g., a camera 128, although other devices, scanners, detectors can be included with or used in place of a camera. As illustrated, the camera 128 is operable to capture bio-identifiable information. For example, a user implements the camera 128 to capture an image of his/her face for the customs module 114. Other example bio-identifiable information includes, a fingerprint image, an image of a traveler's passport, e.g., an image of the picture included in the passport, passport information, and so on. In the picture situation, the image is embodied in a file for inclusion in custom information sent to the intermediate.

In some implementations, the customs module 114 specifies the format, e.g., file format that is to be used for the image. The picture may be contained in a variety of file formats including, but not limited to, a jpeg file, a tiff file, a gif file, a pdf file, and so forth. While the customs module 114 can be configured to accept image files stored in memory on the mobile device 102, images available to another application, downloaded from other devices, available via a network, in other embodiments, the customs module 114 is configure only to accept a file containing an image obtained using a camera contained in or physically connected to the mobile device. In further embodiments, the application module is configured to require that an image be captured contemporaneously with or substantially contemporaneously with input of traveler information to minimize the likelihood that an image is not reflective of the user or of a person in the user's group. The foregoing configuration can prevent issues with, for instance, a man using a picture in which he has a beard, while in his current state he is clean shaven.

In embodiments, the customs module 114 is configured to accept information by accessing a third party application on the mobile device (other application 116), a web accessible third party server, and so forth. For example, the customs module 114 is operable to access an airline's website to obtain flight information. Other suitable third party applications, webservers, and so on include, but are not limited to: websites, servers, and databases maintained by credit card suppliers, hotels, driver license authorities, governments, and so forth. For example, rather than manually entering data the user configures the customs module to access profile information stored on her smart phone to obtain the relevant information.

As briefly mentioned, the mobile device in embodiments includes a display 124 (e.g., a monitor such as a touchscreen device) to visually output information. The display is configured to output a variety of information.

As illustrated, the customs module 114 includes an output module 120. The output module is representative of functionality to output information, such as for visual presentation on the display 124. In other embodiments, the output module is configured to output information from the application via a communication technology. For example, the output module provides an electronic receipt or a representation of an electronic receipt through a wireless communication unit for output by another device. For example, instead of displaying information on the display, the mobile device communicates it to another device (e.g., a computer enabled device) for output. In the previous example, a BLUETOOTH (Bluetooth SIG, Kirkland, Wash.) enabled smart phone could communicate an electronic receipt to a kiosk operated by customs officials for presentation on a display associated with the kiosk. The output module 120 can be configured to work in conjunction with the input module 118 to display, for instance, a GUI for inputting information, e.g., user/traveler information.

Other components can be included in the mobile device 102 as well. For example a mobile device includes a wireless unit 128 that is representative of functionality to communicate information in a wireless fashion, e.g. input/output (I/O) functionality. In embodiments, the wireless unit 128 is operable to communicate using a variety of communication networks. The wireless unit 128 in embodiments can include one or more of an 802.11 compliant communication transceiver (e.g., receiver/transmitter), a geographically limited wireless communication network (e.g., for a building or vehicle), BLUETOOTH (Bluetooth SIG, Kirkland, Wash.), a cellular compliant transceiver that is compliant with a commercial cellular standard (4G, 4G LTE, 3G, 5G). An example 802.11 compliant system is a system compliant with 802.1ln, 802.11 ac, 802.11 ad, 802.11 ah, 802.11 aj, 802.11 ax, and the like wireless local area network standards promulgated by the Institute of Electrical and Electronics Engineers (IEEE), New York, N.Y. The customs module 114 may be supported, at least partially supported, and so forth by the intermediate.

In embodiments, the wireless unit 128 is associated with a subscriber identity module (SIM) 130 that may be physically embodied on a "SIM Card" that identifies the mobile device to the intermediate or the authorizing authority. In examples, SIM information is included in customs information provided with traveler and bio-identifiable information that is communicated to the intermediate.

The mobile device 102 and intermediate 104 can communicate in a web-enabled manner. For example, data communication is performed using hypertext transfer protocol (HTTP) or hypertext transfer protocol secure or hypertext secure sockets (both are referenced as HTTPS). In an additional implementation, extensible hypertext markup language (XHTML) can be used to communicate or present information. The mobile device 102, intermediate 104, and/or authorizing authority 108 can implement other standards, such as extensible markup language (xml), in conjunction with or separate from public key encryption (PM) used to encrypt the data for communication or storage. In the preceding examples, the intermediate 104 provides the application functionality, data, and so on while the two are communicatively coupled.

Although the mobile device 102 is illustrated as smart phone, suitable mobile devices implement a variety of form factors, support a wide range of functionalities, including a variety of hardware, and so on. Example mobile devices include, but are not limited to, smart phones, tablets, laptops, netbooks, personal digital assistants, wearable computing devices (e.g., smart watches, computer-enabled glasses), and the like that provide computing functionality.

In embodiments, the mobile device 102 is configured to output information prior to collection of traveler information and/or capture of bio-identifiable information. For example, the program is configured to output, e.g., display information to a user, before the input module permits the user to take a picture or enter data. In embodiments, the information comprises one or more of information that indicates inputting information via the application is voluntary. In additional embodiments, the application displays disclosure information mandated by a third party (e.g., a government or non-governmental organization) prior to accepting information. For example, the application displays a "pop-up" that explains one or more of privacy rules, a legal basis for asking for the information, a further explanation of what the information is to be used for, an information retention policy that is to be applied, legal ramifications associated with the information to be provided, an opt-out option, and combinations thereof.

As illustrated, the intermediate 104 and/or the authorizing authority 108 can support one or more mobile devices, e.g., a plurality of mobile devices. As shown, the intermediate 104 supports mobile devices 1 through N (131). The plurality of mobile devices, for instance, may be those mobile devices physically present on an airplane traveling from Paris, France to the Minneapolis-Saint Paul Airport in the United States of America (U.S.). In another example, the intermediate supports mobile devices destined for a particular airport, dock, or train station. For example, the intermediate 104 is a server supporting Reagan National Airport in Washington, D.C. In additional examples, a common carrier, e.g., an airline, maintains/operates one or more servers for this purpose.

In embodiments, the mobile device 102 and intermediate 104 communicate using a client-host paradigm. The intermediate 104 in implementations is operated by, an airport authority, a municipality, an airline, a state government, a national government, an agency or department of a federal government, a for-profit entity, a not-for-profit entity, a non-governmental organization, a trusted or prescreened organization, and so forth.

In some embodiments, the intermediate 104 and authorizing authority 108 are contractually obligated and/or have agreed to interact according to pre-established standards. The authorizing authority 108 may have engaged with multiple intermediates located at different physical locations (e.g., different airports, or dock terminals). For example, the authorizing authority supports all the intermediates operating in a particular country, in an area or region of the country, in a state, city, travelers using a particular mode of travel (e.g., support travelers arriving by airplane), and so forth. In embodiments where more than one authorizing authority is used, the authorizing authorities can be communicatively coupled. In these instances, the authorizing authorities handle tasks in a distributive manner, be communicatively coupled to check one another, e.g., avoid multiple use of the same identity (e.g., same name, picture, passport, or travel documents).

The intermediate 104 can perform a variety of functions on its own behalf, on behalf of the authorizing authority, or mobile device. For example, the intermediate 104 collects information from third parties for the mobile device 102. An example of the foregoing is the intermediate collecting traveler information from a third party webserver, e.g., an airline server to provide traveler information, flight number, arrival time, destination airport code, departure airport code, names of people in the travelers, and so on.

In instances, the intermediate 104 is configured to validate information such as traveler information. The intermediate, for instance, validates customs information submitted by the mobile device to ensure it is validly formatted (e.g., the contained information is properly formatted), conducts an initial review of the information, or a combination thereof. For example, the intermediate checks customs information to determine if it is a duplicate of previously submitted information (e.g., information has already been submitted for a traveler). The intermediate's validation and/or initial review functionality can be embodied as a validation module 132 as described below and/or as described with respect to the mobile device 104. The validation module 132 is representative of functionality to validate information, e.g., a script or program of instructions that validates the information being checked.

A validation module 132, whether embodied on the mobile device or intermediate, can be a validation script that executes to perform validation logic. In some embodiments, portions of validation/initial review functionality are performed by the mobile device, e.g., the validation module 126, while other validation and/or initial review functionality is performed by the intermediate, e.g., validation and/or initial review is performed in a distributed manner.

As should be apparent, the authorizing agent 108 can include validation functionality as well or in-place of the functionality of that of the mobile device or intermediate. While possible, validation and/or initial review by the mobile device or intermediate can minimize the processing burden on the authorizing authority. For example, the intermediate checks customs information and rejects information that is not in the correct format, is blank, lacks required information (e.g., an acknowledgement that the user certifies the information to be accurate). In this manner, the intermediate eliminates or minimizes the processing burden imposed by ill-formed information on the authorizing authority 108.

The intermediate 104 as part of validation can provide the mobile device 102 a status indication responsive to the validation. For example, the intermediate sends the mobile device an email, an electronic notification to the application that the customs information has been accepted, in response to a determination that the information is well-formed. In contrast, if the information is not valid the intermediate can send the mobile device an error message, a message that requests the omitted information, further instructions or guidance related to the omitted information, combinations of these approaches, and so forth.

Example validation determinations include, validating the user provided answers to yes/no or selection questions, e.g., male or female, fill-in the blank answers contain content. With respect to an initial review, the validation module can check whether a city name is correct for a state or territory, e.g., determine that the city "Ames" corresponds to the state "Iowa."

The validation module 132 for example take one or more validation rules associated with the application and generates client validation script to be embedded in the customs module or a web-enabled version of the customs module 114. Thus, the validation module 132 on the intermediate generates validation script, e.g., data validation script, when a HTML text box is displayed by the output module 120 on the mobile device. This can permit direct usage of the validation rules by the customs module 114 on the mobile device 102.

In embodiments, the validation module 132 on the intermediate is operable to obtain a locale associated with the mobile device. In a specific example, the intermediate determines the mobile device's locale from an IP address or other locale information from the mobile device 102. A locale can be used to indicate which validation rules are to be used as the basis for the client validation script, e.g., language checking, validity of answers, and so on.

In some embodiments, the intermediate encapsulate the customs information for communication to the authorizing authority. For example, the intermediate includes a encapsulation module 134 that represents functionality to encapsulate information in one or more packets with header information that is useable to cause the packet(s) to pass through a firewall 136. For example, the encapsulation module 134 encapsulates customs information with additional information in the packet header so the firewall 136 allows the packet through, e.g. opens up a port for the packet, and so on. The firewall 136 is included to prevent malicious activity, unauthorized communication of information, access to records stored in memory associated with the authorization agent, and so on. Although the intermediate 104 can use multiple packets to communicate information, the packets may be linked by a session identifier, an identifier for the mobile device, and the like for coordinating information.

The intermediate 104 can be configured to delay communication of the information to the authorizing authority 108. The intermediate for instance delays communication of encapsulated customs information until a predetermined time or upon occurrence of an event. For example, the intermediate waits to communicate customs information until a plane carrying the traveler has landed or is expected to land, e.g., based on a manifest.

The intermediate in the preceding example can validate and/or initially review the information prior to storage, while in other instances it stores the information and then process it upon occurrence of the event or the predetermined time, or combinations thereof (e.g., process some information while storing other information and then processing it). In scenarios such as this, the intermediate 104 may store the customs information (whether encapsulated or not) in memory.

The authorizing authority 108 can be configured to prevent reception of traveler information until the occurrence of an event, a predetermined time, or receive but not act upon information until the occurrence of an event or predetermined time. Configuring the intermediate and/or the authorizing authority according to one or more of the preceding manners, may avoid or minimize the likelihood of the authorizing authority 108 reviewing customs information for a traveler whose travel plans changed, minimize the likelihood that the authorizing authority incorrectly authorizes access to the country, minimizes the authorizing authorities processing burden, and so forth.

In situations where the intermediate temporarily stores customs information, it can regulate the amount of customs information sent to the authorizing authority. For example, rather than sending all the customs information stored on the intermediate, the intermediate is programmed to send the information over a period of time to avoid overwhelming the authorizing authority. In other instances, the intermediate 104 sends information until the authorizing authority 108 indicates it should delay or stop sending information, at least temporarily.

The intermediate can implement a variety of approaches for determining what customs information is to be prioritized for communication. Example approaches include, first-in-first out, a fee for service, prioritization based on a factor (number of people in travel group, status of traveler/people in traveler's group, e.g., seniors or young children), and so on.

The authorizing authority 108 is representative of functionality to vet the information to authorize, e.g., make a determination, based on the information. For example, the authorizing authority includes a vetting module 138. A vetting module 138 is representative of logic to vet information. In examples, the authorizing authority 108 vets the information, e.g., customs information, by comparing the information with information in one or more databases 139, manifests 141, and so forth. For example, the authorizing authority 108 vets the information received from the intermediate by comparing it with information in a manifest 141 accessible to the authorizing authority, e.g., a flight or ship's manifest. In the preceding example, the authorizing authority checks the manifest to determine customs information provided by the traveler matches that of the manifest for an airline stored in memory available to the authorizing authority, e.g., memory 140. As should be apparent, the authorizing authority 108 can vet some of the information based on the manifest, while vetting other information based on a predetermined standard, e.g., did the traveler indicate he/she has more than $10,000 in cash. In the preceding example, the logic can check whether the information includes a "yes" or "no" response to the $10,000 in cash question.

The authorizing authority in embodiments includes functionality to record information (e.g., customs information), a result of vetting (e.g., vetting results), modified customs information (e.g., a portion of the customs information or augmented information). For example, the authorizing authority includes a record module 142, enabled by instructions such as a script, that is operative to generate a record 143 that corresponds to information received from the intermediate. Other information that can be includes, but is not limited to, results of a vetting determination, related information (e.g., a unique identifier, a session identifier, intermediate identifier (e.g., server id), and so forth.

In embodiments, the authorizing authority includes functionality to generate an electronic receipt. For example, the authorizing authority includes an electronic receipt module 144, enabled by instructions or a script, capable of generating an electronic receipt related to the record 143. The receipt module 144 can generate an electronic receipt whether the outcome is favorable, negative, or ambiguous (e.g., further inquiry).

A favorable outcome, for example, is an outcome in which the traveler, any other people in the traveler's party and their belongings are to be admitted, although customs personnel still may conduct an in-person interview. A negative outcome can represent, for instance, a scenario in which the traveler, a person in the traveler's travel party and/or one or more belongings is not permitted admittance based on provided customs information. An example of a negative outcome may be an instance where a traveler declared he/she has exotic fruit which will need to be divested prior to proceeding. An example of an ambiguous outcome is a further inquiry such as when a travel misspells his/her name, so the authorizing authority cannot correlate the travelers misspelled name with that in a flight manifest stored in a database in memory 140 associated with the authorizing authority or accessible by the authorizing authority via a network.

In examples, the receipt module 144 is logic configured to generate an electronic receipt that includes one or more of a unique identifier, information that bio-identifies the user, information that bio-identifies another person in the traveler's party, an indication of a vetting determination (e.g., an indication of an outcome of a vetting determination), and at least another portion of the user information. For example, the authorizing authority generates an electronic receipt with a machine readable portion. In the preceding example, the machine readable portion of the electronic receipt can be an optically readable representation, such as a barcode. Example bar codes include, but are not limited to, single dimensional or traditional barcodes, or multidimensional barcodes, e.g., 2D barcode. Example unique identifiers also include session identifiers and record identifiers. Example outcome indications include, but are not limited to, favorable, negative, or further inquiry is to be performed. In some embodiments, the electronic receipt includes customs information and/or bio-identifiable information, e.g., a picture of the traveler's face or a picture of the face of a person in the traveler's travel party (e.g., travel group, such as a student in a school-led foreign language trip. In embodiments, an electronic receipt includes a barcode that uniquely identifies a record stored in a database associated with the authorizing authority, a picture of the traveler and/or pictures of other people in the traveler's party, and the traveler's name and optionally the names of other people in the traveler's party (e.g., children, a spouse, dependent adults). Optionally, an electronic receipt includes customs information, an indication of customs information (e.g., an icon, a graphic image, a color display, instructions (e.g., "proceed to station A"), text). For instance, an electronic receipt includes the text "more than $10,000 in cash" if the traveler indicated he/she was carrying $10,000 or more in cash.

In embodiments, the electronic receipt is useable to query the authorizing authority 108. For example, a barcode output on the mobile phone's display is used to access the record stored in memory associated with the authorizing authority. In the preceding example, a scanner is used to access the record to retrieve information or a portion thereof.

The authorizing authority 108 is in some examples is configured to communicate the electronic receipt to the mobile device 102, e.g., the user's mobile device. For example, the authorizing authority 108 communicates the electronic receipt through the intermediate 104 to the mobile device. In the preceding example, the authorizing authority routes the electronic receipt to the mobile device using one or more of a session identifier, an intermediate identifier, a SIM for the mobile device, a unique identifier (provided by one or more of the mobile device, intermediate, or authorizing authority), or a combination thereof. An example of a combination is a unique identifier that is based on a session identifier and an intermediate id. In examples, the intermediate communicates the electronic receipt to the mobile device for output by the customs module on the display. In other instances, the authorizing authority or the intermediate sends an email (electronic mail) or a text message (e.g., a short message service (SMS) message) that includes the electronic receipt, a visual representation of the electronic receipt (e.g., a portable document format (pdf) file with a representation of the receipt, an email or text message with a link to the electronic receipt, and the like for communicating and/or accessing the electronic receipt.

In further embodiments, the intermediate sends more than one copy of a receipt. For example, the intermediate sends a copy to the customs module and a confirmatory copy as an attachment to the user's email. In some embodiments, the confirmatory copy is in a format that does not permit manipulation of the electronic receipt, e.g., in an image file. An example file format for containing an image is a portable document format type file, such as a .pdf file from Adobe Systems, Incorporated (San Jose, Calif.).

While use of a single intermediate and authorization authority are described, those of skill in the art will appreciate that multiple intermediates can be used and the various tasks handled among the computing devices in a distributive manner, e.g., dividing up tasks, allocating user devices, and the like among the physical computing devices comprising the intermediate.

Network 106 illustrated in FIG. 1 can comprise any suitable type of network such as the Internet or a wide variety of other types of networks. For example, the network 106 may include a wide area network (WAN), a local area network (LAN), a wireless network, an intranet, the Internet, a combination thereof, and so on. Further, although a single network is shown, the network 106 may be configured to include multiple networks.

"Computer storage media" includes volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a mobile device, computer, server, and so forth.

Having considered an example operating environment, consider now further discussion of example devices, systems, operations, and data flows that provide a framework in accordance with one or more embodiments. The example devices, techniques, approaches, methods, and systems may be used in conjunction with the environment, systems, devices, techniques, and so on described above.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

Example Data Flows

Figure 2A:
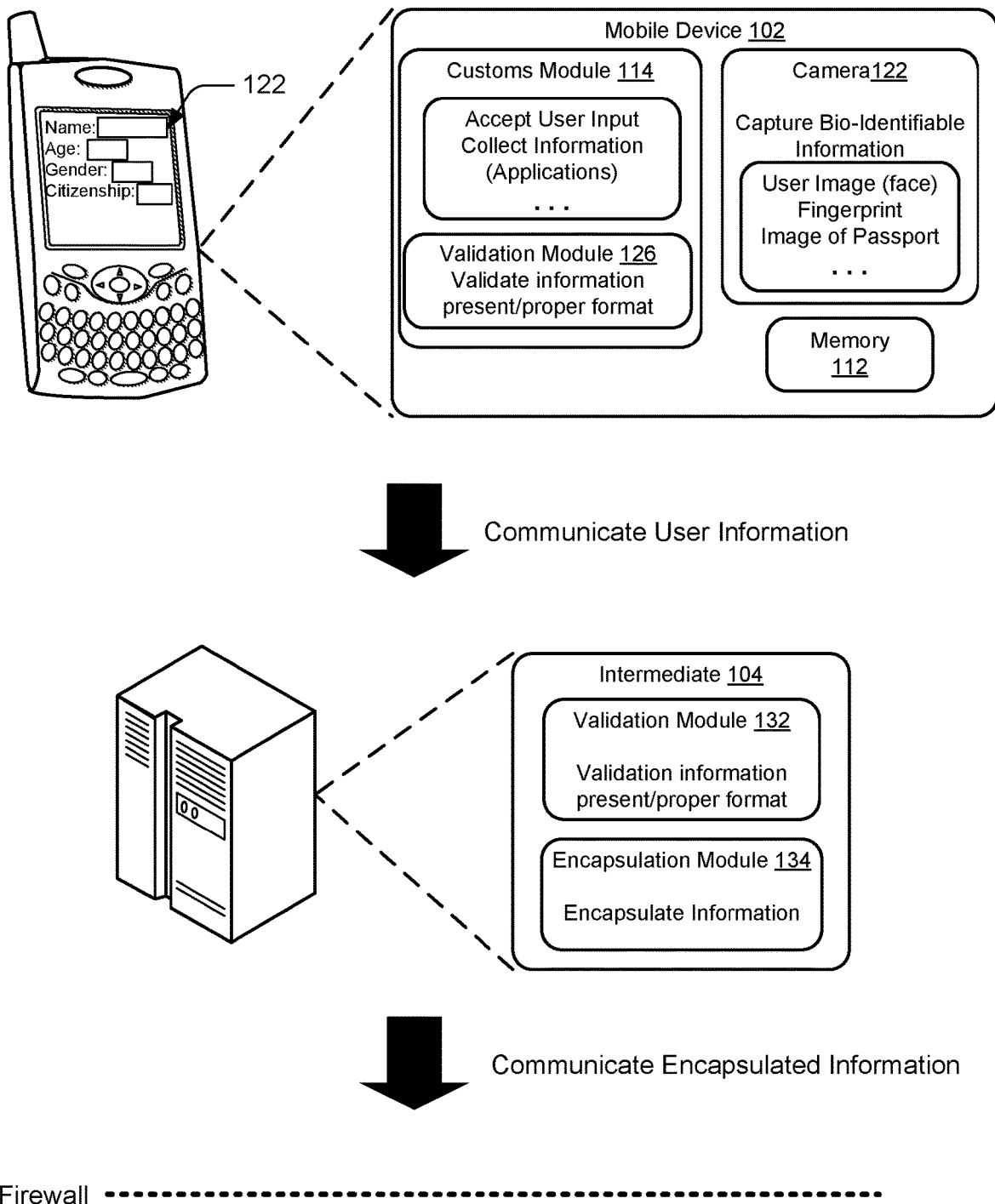
FIGS. 2A and 2B illustrate sample procedures and data flows in accordance with one or more embodiments.
Figure 2B:
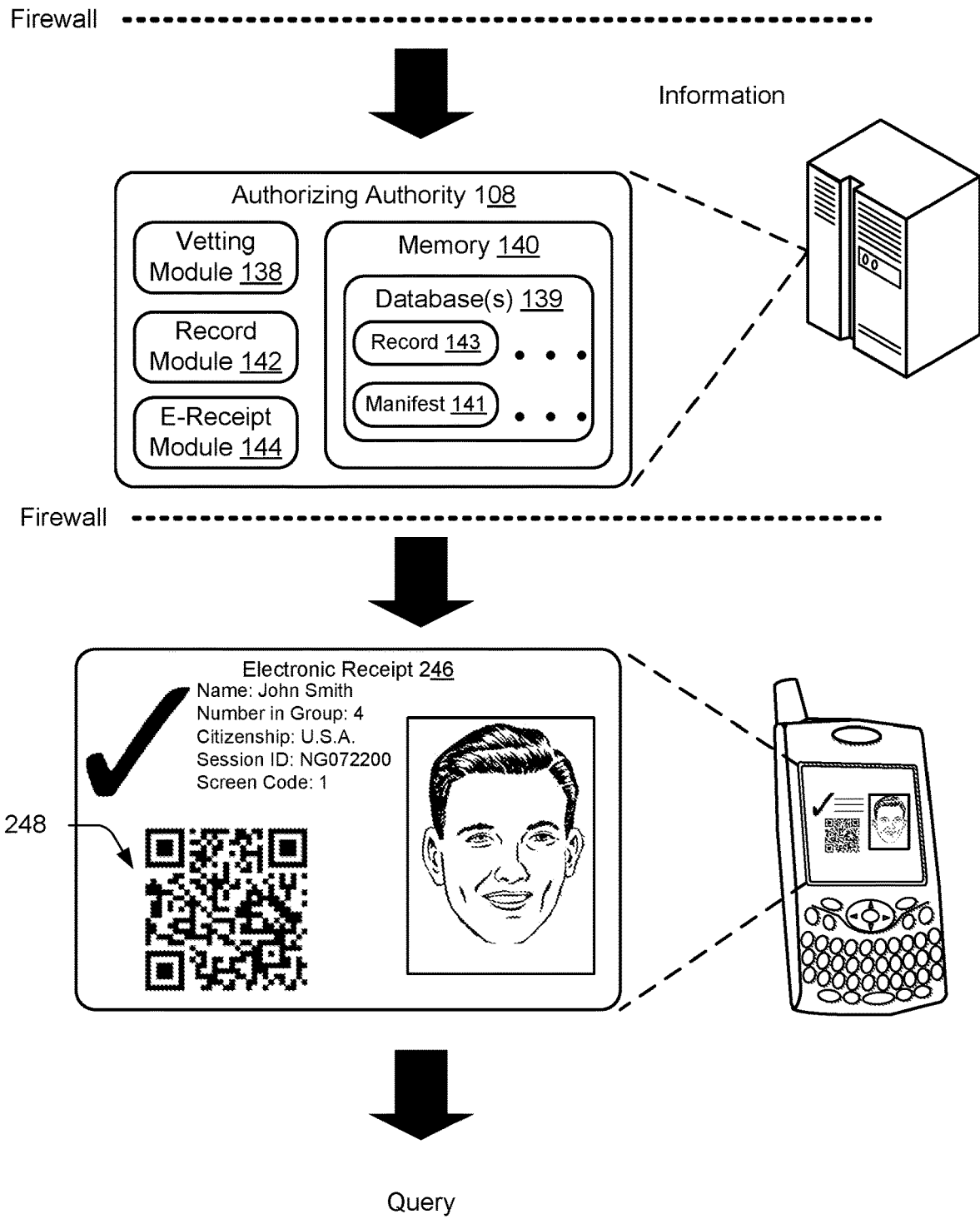

FIGS. 2A and 2B illustrate sample data flows (generally 200) and describe handling, communication, validation, encapsulation, vetting, querying, and use of an electronic receipt in accordance with embodiments of the present disclosure. In these examples, a user implements a mobile device 102, such as that described in FIG. 1 (albeit illustrated in simplified form) to input information that is vetted and receives an electronic receipt that, among other features, can be used to guide interactions with customs personnel. For purpose of this example only, the user is described a traveler (e.g., an adult parent) traveling with an adult spouse and two minor children.

As illustrated in FIG. 2A, the user enters traveler information into an application on his or her smart phone. For the purpose of explanation, the application is illustrated as customs module 114 that is configured to accept user input in order to collect relevant information for submission to the authorizing authority 108. In this example, the user types information into the GUI 122 indicating the names, ages, genders, addresses, and so forth for the people in his/her travel party. For example, the user types in the name of his son and daughter, their ages, genders and their addresses, in addition to that of his spouse. The user may be asked one or more questions relevant to customs related issues. The questions may be presented with check boxes, multiple choice selection inputs, freeform text boxes, limited or restricted input boxes (e.g., test boxes configured to limit what information can be input in some manner), and so forth. An example of the foregoing is displaying a yes or no check box in the GUI 122 along with a question that asks "are you or any member of your party carrying on your person or luggage ten-thousand dollars or more in currency?" As neither the traveler nor his spouse are carrying currency in this amount, the traveler checks the "no" box in the GUI 122 and proceeds to provide additional information, decides to save previously entered information, or selects to "submit the information" if the traveler has answered the presented questions.

If the traveler decides to save the information, it can be saved locally in memory 112 included on the device, stored to a server, such as the intermediate 104, that is accessible to the customs module 114 via a network in a client-host web-enabled fashion, or a combination thereof. Examples of the last two scenarios includes storing some information locally in memory 112 while storing other information on the intermediate, or storing the information locally and on a server, e.g., the intermediate. As should be apparent, several of the foregoing scenarios presume the mobile device 102 and intermediate 104 are communicatively coupled by one or more networks.

As also should be appreciated, the mobile device 102 including the customs module 114 can be configured to operate in standalone mode. In standalone mode, the customs module can provide some functionality, e.g., information input, output an electronic receipt or a portion thereof (e.g., output a barcode suitable for detection by a computer enabled scanner), and so on.

The customs module 114 can be configured to retrieve information from a variety of third party sources, such as another application. For example, a user has another application (e.g., other application 116) that stores profile information, e.g., owner information. In this case, the customs module requests the information from the other application and responsive to the request, the customs module automatically provides the information, e.g., the customs module automatically responds with relevant information contained in the profile. In this situation, the user may still be asked to ratify the information by indicating whether the information is correct or by simply selecting an "I accept", "next", or "save" buttons (e.g., an object displayed in a GUI supported by the customs module with which a user can interact). The customs module can be configured to review the information, by making a selection after the user's responses and/or the corresponding question are output.

The customs module 114 can be configured to validate or conduct an initial review of the information (e.g., prescreen the information). For example, the customs module prompts the user with an "invalid entry" notice that is output on the display, e.g., display 124. The notice can be provided on the screen that is available for the user to enter information, in a popup, e.g., a new pane or window presented on the display device. Whether validation and/or an initial review is to be performed, an appropriate rule can be provided to support the validation functionality illustrated as validation module 126. For example, an address checking script is used to confirm a user input five numerical characters in a text box for the traveler's zip code. The customs module 114 can also be programmed to confirm that the provided zip code corresponds to a city named in another text box or series of text boxes. This initial review or screening can be performed as information is entered (e.g., as typed, clicks save, or "continue" to move on with other questions, or prior to submitting the information for review. In situations where information is not accepted, the user can be notified by the customs module (whether in a popup window or the module itself) or by an alternate means. An example of the latter situation is a customs application that is configured to send an email, a text message, or some other form of notice to the user, e.g., an instant message. It should be appreciated the application may communicate the message, e.g., an email, text, etc. so it appears as if it was sent rather than sending the message through the wireless unit 128, through the cellular communication system and so forth.

The mobile device can be configured to capture bio-identifiable information as well. For example, the customs module interacts with a photography application on the mobile device so a user can capture an image of his/her face for inclusion in customs information. The image can be embodied in a variety of file formats and can be included or embedded in a file containing traveler information or linked by a hyperlink to connect for example a file containing traveler information with a file containing the image.

The customs module can be configured to communicate the information based on user input, e.g., "save to the cloud", upon an occurrence of an event (e.g., a traveler's plane reaching 10,000 feet, the traveler's planning landing or the traveler's ship reaching a gate or dock. In some examples, the mobile device can temporarily halt communication of the customs information (e.g., prevent communication of customs information) until one hour before the plane lands or is scheduled to land, the plane reaches a gate, and so forth. In other embodiments, the mobile device waits to transmit the information unit the mobile device establishes or reestablishes communication with the intermediate. In other instances the mobile device 104 communicates the information, but it is held up by the intermediate 104, at least temporarily by storing it memory, e.g., until the occurrence of an event, a predetermined time, a time dictated by a third part, based on processor resources, and so on.

With continued reference FIG. 2A, the intermediate 104, upon receiving the information, can perform a variety functions. For example, the intermediate uses validation module 132 to check the information in order to determine it is valid by checking for one or more consistencies in the information, looks for duplicate information (e.g., has the intermediate received information for the traveler) and so on. For example, the intermediate, upon receiving customs information, validates it to determine it is correctly formatted. Example validation checks include, ensuring text is provided for each person in a travel party, confirming a response is provided to each question or information entry request, a response is provided to accepting terms of use, an electronic signature or "I agree/confirm this information is correct" has been accomplished, and combinations thereof.

As is noted previously, intermediate validation can be performed in conjunction with validation by a mobile device. In this particular example, validation is performed both on the mobile device using embedded script, such as Javascript (Oracle, Redwoodshores, Calif.), in an application and re-checked by the intermediate. By re-checking the validation, the intermediate can detect, avoid, or minimize unauthorized access. For example, the intermediate performs different validations than that by the customs module on the mobile device.

In embodiments, the intermediate 104 communicates an error and/or failure message to the mobile device, if the customs information is not valid. For example, the output module 120 presents an error "pop-up screen," responsive to an indication that the information is not valid in one or more respects. The intermediate can send an electronic message, e.g., an instant message or electronic mail message that is used to alert a user to a validation state. In examples, the message includes a link that is operable to cause the customs module to provide additional information, allow a user to augment/correct information, or the like via the customs module. For example, the intermediate sends a user an email indicating that one of the children's last name is likely misspelled based on the last names of the other people in the travel party. The email or message can include a link that allows a user to update the information.

In embodiments, an intermediate 104 can perform an initial review of the information or a portion of the information. For example, the intermediate's validation module 132 checks to see whether the information is consistent with other information. For example, the validation module checks to see whether a minor in the travel party has a last name that matches or is a compound version (a hyphenated last name) of at least one adult in the travel party.

In some embodiments, the intermediate maintains a database or table for recording validation/error/initial review results. For example, the intermediate maintains a database that, at least temporarily stores, a record of a validation or initial review errors. The records can be maintained for a predetermined period of time or until the occurrence of an event, e.g., additional or updated information is received by the intermediate, which makes the relevant information valid or pass initial review. In additional examples, an intermediate can maintain a table, e.g., a status table for information processed and/or communicated to the authorizing authority for ultimate disposition. For example, the intermediate maintains a record, including an identifier, such as a session identifier, to track one or more of the receipt, handling, communication of information to an authorizing authority, or receipt of a determination (whether successful, unsuccessful, partially successful, or more information required).

The intermediate 104 can include additional information to the packets. For example, the intermediate adds one or more of a session identifier, an identifier that is unique to the intermediate, validation information, a timestamp, or a combination thereof to the header information.

As illustrated, the intermediate 104 is configured to encapsulate the information in the packets for communication. For example, the encapsulation module 134 packetizes customs information from the mobile device with header information that escorts the information through the firewall. For example, the encapsulation information escorts the customs information to cause a firewall that protects the authorizing authority to allow the customs information to pass to the authority. In some embodiments, encapsulation includes routing information that indicates how/where the information, e.g., the contained information is to be directed.

In embodiments, the intermediate waits to communicate the packets containing the customs information. For example, the intermediate waits to communicate customs information until the occurrence of an event (e.g., the traveler's ship is physically within the country or is expected to be within the country), at a predetermined time (e.g., at a particular time such as 9:36 a.m. Pacific Standard Time or 11:36 a.m. Central Standard Time), and so forth. In further examples, while the intermediate commences communication at a particular time or upon occurrence of an event, the intermediate can spread the information out over a period of time (e.g., fifteen minutes) or until an occurrence of an event, e.g., the authorizing authority indicates communication is to be delayed to avoid overwhelming the authorizing authority servers.

Referring to FIG. 2B, in embodiments the firewall allows the packets/information to pass through an "open a port." Opening a port allows the encapsulated customs information access through the firewall based on the header information in the packet, e.g., encapsulation information. In embodiments, the firewall opens the packet, or de-encapsulates the contained information, and then passes it to the authorizing authority. In this scenario, the firewall strips away the encapsulating information and passes the underlying header information, header information added by the intermediate, customs information, or a combination thereof to the authorizing authority.

As further illustrated in FIG. 2B, the authorizing authority is configured to vet information base on one or more criteria. For example, a vetting module checks a flight manifest stored in memory to determine whether the names of people provided by a traveler matches that of people in a flight manifest. A vetting module is representative of functionality to compare information (e.g., text entered in a text box) to determine based on one or more rules what result is to be provided, e.g., route traveler for secondary screening, indicate the traveler can enter the country, request additional information/ask questions.

In embodiments, the authorizing authority accesses a manifest or other information via a network, e.g., an airline database. For example, the vetting module accesses a database of known criminals to determine if the name provided by a traveler is a known alias. Although a manifest is described, in other instances an authorizing authority can use rules maintained in other databases, memory, and so forth, or a combination thereof. For example, the authorizing authority compares customs information with a rules table to decide what determination to reach, e.g., how to respond. Example determinations include, but are not limited to, return an electronic receipt, send an error message, how to send an error message, request additional information, "alert customs personnel", combinations thereof and so on. As should be appreciated, the vetting module can use a variety of resources in making its determination. For example, the vetting module checks a remote service that provides criminal records, background information (e.g., publicly available information for use in authenticating the traveler's identity), no entry lists, databases of bio-identifiable information, combinations thereof, and so forth. Example actions include, but are not limited to: permitted entry, denied entry, further information required, primary screening, secondary screening, and combinations thereof.

Responsive to vetting, the authorizing authority 108 creates a record 143. For example, a records module is used to generate a record of the customs information or a portion thereof, a vetting determination, and a unique identifier in a database included in memory. The records module, for instance, as part of the vetting process generates a record that is stored in memory 140. In the previous example, the authorizing authority 108 creates a record 143 to store the customs information along with additional information. Example information includes, but is not limited to, a determination or result of the vetting process, a unique identifier associated with the record, information provided by an intermediate (e.g. intermediate id, session identifier, communication id, timestamp, software version, IP address, routing information), additional information provided by or augmented by the authorizing authority (e.g., a time stamp, software version).

In embodiments, the authorizing authority 108 is configured to generate an electronic receipt 246 that is associated with the record that includes the vetting determination. For example, the authorizing authority generates an electronic receipt for communication to the mobile device, an electronic mail box designated in customs information (e.g., an email address designated by a user), a network enabled storage location (e.g., cloud storage), storage in memory 112 or associated with the intermediate 104, and combinations thereof.

An electronic receipt 246 can include a variety of information. Example information includes customs information or a portion thereof (e.g., name, picture, "key information"), information provided by an intermediate (e.g., server id, date stamp), authorizing authority information (e.g., a vetting result, a session identifier, a unique id number), a machine readable unique identifier (e.g., a barcode), and so forth.

In examples where personally identifiable information is provided, appropriate encryption or other data protection mechanisms can be used to protect the privacy of the information. Information provided as image files can be appended to the electronic receipt or be embedded in a file with the other information. For example, the authorizing authority generates an image file that contains human-understandable information, such as name, gender, age, is included in an image type file with a picture of the traveler and a barcode. Providing an electronic receipt in this manner may prevent tampering with the information. Example image type formats included, but are not limited to, jpeg files, tiff "files", pdf type "files", and so on.

In embodiments where a machine readable unique identifier is to be provided, the authorizing authority includes an electronic receipt module 144 suitable for generating one. For example, the authorizing authority includes an electronic receipt module configured to generate a barcode 248 that uniquely identifies the record 143. Other forms of unique identifiers include session identifiers, record numbers, and combinations thereof (including the use of multiple identifiers). Additional information can be incorporated with the unique identifier, e.g., the unique identifier is a representation of information, or a portion thereof, with which it is associated. Example information includes customs information, a result of a vetting determination, intermediate information, authorizing authority information, combinations thereof, and so forth. For example, a barcode can corporate information in the bar code (e.g., the traveler's name, age, gender, address, nationality) as the unique identifier and/or with a unique identifier (e.g., a session identifier). Appropriate encryption can be used to limit access to the information, although the information is present in the unique identifier.

In other embodiments, the authorizing authority passes back a "link", such as a hypertext transfer protocol link that is useable to access a corresponding electronic receipt maintained in memory on the authorizing authority, the intermediate, or a form of cloud data storage.

As should be apparent, access to an electronic receipt and/or the underlying record can be restricted. For example, while the receipt module 144 generates an electronic receipt embodied as a barcode, additional information (e.g., a "key") may be required to access the record. In this situation, the key can be provided by a scanning device (such as computer enabled kiosk at a customs checkpoint) to access the record, e.g. a result of the vetting determination. In this way, the vetting determination and/or information from the record can be obscured from a mobile device receiving the electronic receipt. Responsive to scanning the barcode displayed on the mobile device, the kiosk can output information, an indication of the vetting determination, instructions, guidance on where the traveler is to physically go (e.g., please go to inspection area "G", "please pick up your luggage and thank you for traveling to the United States of America", and so on.

In embodiments, the mobile device 102 or another device, such as an optical scanner enabled with a computer queries the authorizing authority 108 for information related to the record using the electronic receipt 246. For example, the mobile device receives an electronic receipt with a barcode, e.g., an image of a barcode, that is read by an optical scanner to access information associated with the record stored in memory 140. The scanner device is operable to access a corresponding record provide information based on the receipt itself or using the receipt to direct the traveler and so on. Continuing the previous example, the customs module on the mobile device is configured to retain the electronic receipt or a portion thereof (e.g., a link or some information from the record) in memory 112 to ensure a user has access to the receipt even though the mobile device loses communication with the intermediate.

As is to be apparent that the application, modules, intermediate, authorizing authority and the techniques, and approaches described herein may be used in conjunction with the other modules, services, techniques and approaches described throughout this document. It is the intention of this document to encompass and include such variations.

Example Methods

The following discussion describes procedures that may be implemented utilizing the previously described systems, techniques, approaches, and devices. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems, devices, modules, applications, approaches, and techniques described above. While some block/decisions are captioned as "optional", there is to be no negative inference with respect blocks/decisions that are not denominated as "optional", i.e., the blocks/decisions are not "mandatory". In accordance with some embodiments, information is stored in memory (at least temporarily) during performance of the methods for a variety of reasons. Example rationales include, but are not limited to, data processing convenience, communication convenience, permit batch validation/review, records maintenance, and so on, and combinations thereof.

Figure 3:
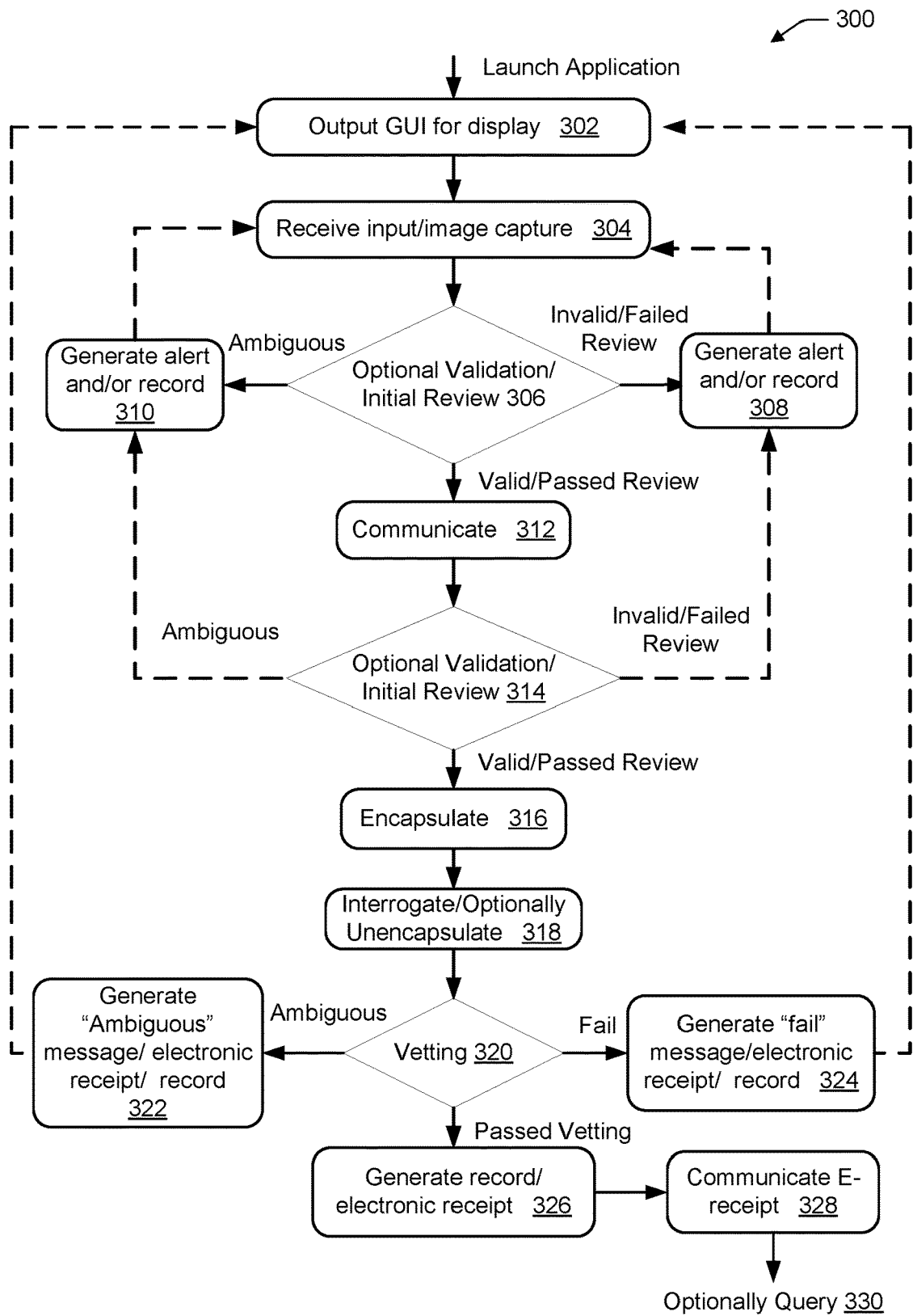
FIG. 3 is a flow diagram that describes steps in a method in accordance with one or more embodiments.

FIG. 3 is a flow diagram 300 that describes steps in a process for providing information. For example, the method is used to provide a customs declaration. The steps can be implemented in connection with any suitable hardware, software, firmware or combination thereof. In at least some embodiments, the method can be implemented in software by such as described above.

Step 302 outputs a graphical user interface (GUI) for display. For example, the application is programmed to output a GUI on the display 124 of the mobile device. The GUI may present a variety of information with appropriate text boxes, checkboxes, etc. for collecting information. For example, the GUI provides one or more text boxes to accept user input via the touch screen display on a mobile device.

Step 304 receives input and/or image capture information. For example, the GUI receives information input by the user via a keyboard. In additional embodiments, receiving information includes receiving bio-identifiable information such as an image captured by a camera on a mobile device, e.g., a picture of a person's face. In the preceding example, an application that performs at least some of the steps of a method can receive the image from another application (e.g., other application 116) that is configured to manage the image capture device, e.g., the camera. While a camera application, for instance may be able to output bio-identifiable information in a variety of file formats, a customs application may specify one or more characteristics relating to the information. Example information includes, file type, file size, minimum resolution, color contrast, overall image brightness, meta data (e.g., capture date, mobile device id, image capture device information), security, combinations thereof, and the like characteristics.

As described at other places in this document, information input can occur even though a mobile device performing the method are not in communication with an intermediate or a network enabled server. In examples such as this, the information may be stored temporarily in memory, such as memory 112, until communication is re-established, a user decides to "upload" information to the intermediate, and so forth.

Step 306 is an optional validation and/or review. For example, a customs module on a mobile device is configured to validate and/or perform an initial review to determine whether data entered in a text box is valid (e.g., numbers are entered into a zip code text box) and pass review (e.g., five numeric digits correspond to an actual zip code). As illustrated, several outcomes can occur. Example outcomes include, valid and/or passed review (an affirmative outcome); not valid and/or did not pass review (a negative outcome, generally illustrated as 308); or ambiguous (e.g., more information is to be requested or some vetting/review was not wholly successful, generally illustrated as 310). An example of the latter situation, is a situation in which, for example, a zip code text box is valid (includes numbers), but the numbers do not correspond to a recognized zip code. In scenarios that result in a not valid, no pass, or ambiguous outcomes, a record can be generated that notes the determination (non-validation or review failure), stores relevant data, and so forth. An alert, an error message, or a message that facilitates corrective action can be displayed by the output module 120 on the mobile device.

In some embodiments, the information or a portion thereof is encrypted. For example, the application encrypts traveler information or a portion of the traveler information in anticipation of communicating it to the intermediate. In this instance, public/private key encryption similar to that used at other points in the process is used to protect the message.

Step 312 is representative of communicating information, such as to an intermediate. Customs information can be communicated via a variety of wireless communication technologies, BLUETOOTH, a local area connection, a cellular connection, and so forth. For example, the information is communicated wirelessly over a local area network (e.g., an 802.11 type wireless connection) or a cellular communication network (4G, 3G, and so on via appropriate hardware in the mobile device).

Step 314 represents optional validation and/or review of information, such as by an intermediate. Validation and/or review of information by an intermediate can be performed in a manner similar to that performed by the mobile device, although variation can occur. For example, the validation module 132 for an intermediate sends an email or instant message to the mobile device or an email or instant message mailbox associated with the user or the mobile device. In the latter example, the intermediate could send the mobile device a text message to alert such as, please check the address used in your customs information, or provide a link that is operable to permit the user to review (e.g., invalid/failed initial review 308), augment, or change his or her information (e.g., ambiguous notice 310). Naturally, the intermediate can also send out an affirmative message, e.g., "congratulations your information is accepted"

As illustrated, the optional validation has multiple outcomes including affirmative, negative, or ambiguous. The outcomes may mirror those discussed above with respect to localized validation. Naturally, variation can occur between localized validation/initial review and "remote" validation and/or review that may be performed by the intermediate or authorizing authority. This is to say that while a validation module on an intermediate can duplicate that occurring on a mobile device, in some embodiments the validation/review is different than that performed by a validation module on the mobile device.

Step 316 is representative of an encapsulating information that is to be communicated to an authorizing authority. For example, the intermediate encapsulates validated customs information for communication to the authorizing authority. In the preceding example, header information is added to packets of information forwarded to a firewall so the packet is recognized source, e.g., authenticated as coming from a "trusted" source. This procedure can be employed to reduce or eliminate threats from third parties attempting to or causing one or more of: a denial-of-service-attack, providing misleading customs information, unauthorized access to information in records stored in memory with the authorizing authority, obtaining information or an electronic receipt (such as for use in a spoof-attack), and so forth.

Step 318 is representative of interrogating the packet to determine if the packet itself or a subset of information in the packet is suitable for forwarding by the authorizing authority. In examples, a firewall can interrogate the packet to determine if it or some of the information contained therein is to be forwarded on to authorizing authority. In some embodiments, the firewall strips out information (e.g., header information, irrelevant header information) while allowing other portions of the header or customs information to be passed along for use. Optional unencapsulation can be performed as well. For example, information in the packet is removed/send on for vetting by an authorizing authority.

Step 320 is representative of vetting information to determine whether the information meets one or more criterion. For example, vetting comprises checking the information to determine if based on one or more criterion: a portion of the information, any portion of the information, one or more portions information meets a standard set by that criterion. For example, a criterion of "is produce being transported" is met if vetting indicates the traveler answered "yes" to the question "are you carrying any produce". Different outcomes can be assigned to the criterion based on rules implemented by the authorizing authority. In the previous produce example, the rule may specify "direct traveler/party to secondary screening", while in other examples, the rule may provide instructions to, for example, a customs official to "ask traveler about produce" and/or "witness traveler disposal of declared produce". The instructions embodied by the rule can be communicated or accessed by the customs official through use of an electronic receipt which has been previously described and is discussed in further detail below. Accordingly, different messages and electronic receipts can be generated along with creating a record. Example messages include an "ambiguous" message, e.g., more information required (illustrated generally by 322), a negative message, e.g., "please see a customs official" (illustrated generally by 324), and so on.

Step 326 is representative of a step or steps of creating a record responsive to the validation. For example, an authorizing authority includes a record module that creates a record that is uniquely identifiable in memory. In this example, the record can be pre-populated with the customs information, a portion of the customs information, information provided by the authorizing authority, and so forth before a vetting determination is added to the record. In other instances, a record is not generated until a vetting determination is made, at which time one or more of the relevant information, a vetting determination, a unique identifier, electronic receipt information, or a combination thereof are stored in memory upon creation of the record.

Step 328 is representative of a step or steps of communicating an electronic receipt. In one example, generating an electronic receipt comprises generating a unique identifier that identifies the record created in step 324. Example unique identifiers include, but are not limited to a unique combination of characters (e.g., letters, number, Unicode character symbols (e.g., %$#*@), a machine-readable unique identifier (e.g., a bar code), a unique link (e.g., a http or https type link), information from the customs information, and the like unique identifiers including combinations thereof.

Optionally, information in the record can be queried (illustrated as 330) using the unique identifier. For example, a customs official uses a scanner, e.g., an optical scanner enabled by a computer, to scan a barcode output on the display to query the authorizing authority for information from the record. In this example, while additional information may be incorporated in the barcode itself (e.g., information encoded into a barcode) or with the barcode (e.g., a name, picture, etc. output with the barcode), the scanner can access information from the record itself.

Conclusion

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A system, comprising:
  an intermediate, configured to communicatively couple to a mobile device and to a firewall that blocks from an authorization agent packets that do not have headers containing a header information indicating a trusted source, the intermediate comprising:
    an encapsulation module that includes a program of instructions embodied in a non-transitory media and configured to cause the intermediate to:
      receive packets from the mobile device, the packets containing customs information,
      electronically encapsulate the packets into encapsulated packets, containing at least a portion of the customs information and having headers that contain the header information, and
      communicate the encapsulated packets to the firewall for delivery, to the authorization agent, of information from the at least a portion of the customs information, based at least in part on the header information.

2. The system of claim 1 wherein the encapsulation module is configured to generate the header information with a form usable by the firewall to open a port for at least a portion of the customs information to pass through the firewall to the authorization agent.

3. The system of claim 1 wherein the authorizing agent is configured to:
  generate a barcode that uniquely identifies the customs information; and
  communicate information that is operable by the mobile device to cause a display in the mobile device to output the barcode, for an optical scanner to have access to at least a portion of the customs information.

4. The system service of claim 3 wherein the optical scanner is communicatively coupled to the intermediate.

5. The system of claim 3 wherein the barcode incorporates, in machine readable form, at least a portion of the customs information.

6. The system of claim 3 wherein the barcode incorporates, in machine readable form, a link to the customs information in a database that supports the service.

7. The system of claim 1 wherein:
  the intermediate further comprises a verification module configured to cause the intermediate to validate at least a portion of the customs information.

8. The system of claim 1, the intermediate being further configured to delay communication of the encapsulated packet to the firewall until an occurrence of an event.

9. The system of claim 1, the intermediate being further configured to delay communication of the encapsulated packet to the firewall until a particular time.

* * * * *